United States Patent [19]

Oda et al.

[11] Patent Number: 4,510,303

[45] Date of Patent: Apr. 9, 1985

[54] ETHYLENE-ALPHA-OLEFIN-POLYENE RANDOM COPOLYMER RUBBER

[75] Inventors: Hidekuni Oda, Iwakuni; Syuji Minami, Otake; Hiroshi Inoue, Iwakuni; Akira Matsuda; Yohzoh Yamamoto, both of Ichihara, all of Japan

[73] Assignee: Mitsui Petrochemical Industries, Ltd., Tokyo, Japan

[21] Appl. No.: 492,244

[22] Filed: May 6, 1983

[30] Foreign Application Priority Data

May 6, 1982 [JP] Japan .................................. 57-74613

[51] Int. Cl.³ ............................................ C08F 210/18
[52] U.S. Cl. .................................. 526/282; 526/169.2; 525/332.8
[58] Field of Search ............................ 526/282, 169.2; 525/332.8

[56] References Cited

U.S. PATENT DOCUMENTS

| | | | |
|---|---|---|---|
| 3,554,988 | 1/1971 | Emde et al. ........................ | 526/282 |
| 3,674,754 | 7/1972 | Cameli et al. ...................... | 526/282 |
| 4,200,722 | 4/1980 | Pennings et al. ................... | 526/282 |
| 4,259,468 | 3/1981 | Kajiura et al. ..................... | 526/282 |

Primary Examiner—Paul R. Michl
Assistant Examiner—A. H. Walker
Attorney, Agent, or Firm—Armstrong, Nikaido, Marmelstein & Kubovcik

[57] ABSTRACT

An ethylene-alpha-olefin-polyene random copolymer rubber comprising ethylene, an alpha-olefin having 3 to 10 carbon atoms and a polyene, wherein (A) a molar ratio of ethylene/alpha-olefin is 55/45 to 95/5, (B) the polyene is a mixture of 5-ethylidene-2-norbornene (ENB) and 5-vinyl-2-norbornene (VNB) in a molar ratio of ENB/VNB of 1/1 to 20/1, (C) an iodine value of the copolymer rubber is 2 to 40, (D) an intrinsic viscosity $[\eta]$ of the copolymer rubber is 1.0 to 6.0 dl/g measured in decalin at 135° C., and (E) $g_\eta^*$ defined by a ratio of the intrinsic viscosity $[\eta]$ to an intrinsic viscosity $[\eta]l$ of a linear ethylene-propylene random copolymer having an ethylene content of 70 mole % and the same weight-average molecular weight determined by a light-scattering method as that of the copolymer rubber is 0.2 to 0.9. Also a process for preparing this random copolymer rubber and vulcanizate derived from the same are also disclosed. This random copolymer rubber has an excellent extrudability and a fast cure rate and provides a vulcanizate having high tensile strength.

7 Claims, No Drawings

ETHYLENE-ALPHA-OLEFIN-POLYENE RANDOM COPOLYMER RUBBER

BACKGROUND OF THE INVENTION

1. Field of the Invention

The present invention relates to ethylene-alpha-olefin-polyene random copolymer rubber having excellent extrudability and physical properties and a method for the production thereof. It also relates to vulcanizate obtained from the ethylene-alpha-olefin-polyene random copolymer rubber.

2. Description of the Prior Art

Ethylene-alpha-olefin-polyene terpolymer rubber such as ethylene-propylene-polyene terpolymer rubber ("copolymer rubber" hereinbelow) generally has excellent weathering resistance, ozone resistance, heat aging characteristic, and other characteristics and, therefore, is widely used as materials for automobiles, electric wires, buildings, and other various industrial products. For these purposes, copolymer rubber having, for example, excellent extrudability, a fast cure rate, and excellent tensile strength of the vulcanizate is desired. However, copolymer rubber having all these desirable characteristics is not commercially available. For example, typical copolymer rubber, ethylene-propylene-5-ethylidene-2-norbornene copolymer rubber has advantages of a fast cure rate and high tensile strength of the vulcanizate. However, since ethylene-propylene-5-ethylidene-2-norbornene has poor extrudability, it is difficult to obtain molded articles having a good surface appearance of the extrudate. Another typical copolymer rubber, ethylene-propylene-dicyclopentadiene copolymer, has excellent extrudability, but the cure rate thereof is slow and the tensile strength of the vulcanizate is not good.

Various attempts have been made to improve various characteristics of copolymer rubber by using two or more polyene components, as disclosed in, for example, U.S. Pat. Nos. 3,594,348 and 3,554,988, and Japanese Unexamined Patent Publication (Kokai) Nos. 49-62582 and 49-62583. However, copolymer rubber having all the above-mentioned desirable characteristics have not been developed. For example, although U.S. Pat. No. 3,554,988 discloses the combined use of 5-ethylidene-2-norbornene and dicyclopentadiene, copolymer rubber having the desired balance of the extrudability, cure rate, and tensile strength of the vulcanizate cannot be obtained, i.e., one of the above-mentioned desirable characteristics is not satisfactory depending upon the proportion of 5-ethylidene-2-norbornene and dicyclopentadiene contained in the copolymer rubber.

SUMMARY OF THE INVENTION

Accordingly, an object of the present invention is to eliminate the above-mentioned problems of the prior arts and to provide copolymer rubber having excellent extrudability and fast cure rate, as well as high tensile strength of the vulcanizate.

Another object of the present invention is to provide a process for preparing copolymer rubber having excellent extrudability and fast cure rate, as well as high tensile strength of the vulcanizate.

Other objects and advantages of the present invention will be apparent from the following descriptions. In accordance with the present invention, there is provided an ethylene-alpha-olefin-polyene random copolymer rubber comprising ethylene, alpha-olefin having 3 to 10 carbon atoms, and polyene, wherein (A) the molar ratio of the ethylene/alpha-olefin is 55/45 to 95/5, (B) the polyene is a mixture of 5-ethylidene-2-norbornene (ENB) and 5-vinyl-2-norbornene (VNB) in a molar ratio of ENB/VNB of 1/1 to 20/1, (C) the iodine value of the copolymer rubber is 2 to 40, (D) the intrinsic viscosity $[\eta]$ of the copolymer rubber is 1.0 to 6.0 dl/g measured in decalin at 135° C., and (E) $g_\eta^*$ defined by the ratio of the intrinsic viscosity $[\eta]$ to an intrinsic viscosity $[\eta]l$ of a linear ethylene-propylene random copolymer having an ethylene content of 70 mole % and having the same weight-average molecular weight determined by a light-scattering method as that of the copolymer rubber is 0.2 to 0.9.

In accordance with the present invention, there is also provided a process for preparing ethylene-alpha-olefin-polyene random copolymer rubber comprising the step of copolymerizing ethylene, alph-olefin having 3 to 10 carbon atoms, 5-ethylidene-2-norbornene, and 5-vinyl-2-norbornene in a hydrocarbon solvent in the presence of a catalyst formed by (i) a soluble vanadium compound having the formula:

$$VO(OR)_n X_{3-n} \tag{I}$$

or

$$VX_4 \tag{II}$$

wherein R is a hydrocarbon radical having 1 to 10 carbon numbers, X is a halogen atom, and $0 \leq n \leq 3$; and (ii) an organoaluminum compound

$$R'_m AlX'_{3-m} \tag{III}$$

wherein R' is a hydrocarbon radical having 1 to 10 carbon atoms, X' is a halogen atom, and $0 < m < 3$.

DESCRIPTION OF THE PREFERRED EMBODIMENTS

The copolymer rubber according to the present invention is random copolymer derived from ethylene, an alpha-olefin having 3 to 10 carbon atoms, ENB, and VNB.

Examples of alpha-olefins having 3 to 10 carbon atoms usable in the present invention are propylene, 1-butene, 1-pentene, 1-hexene, 4-methyl-1-pentene, 1-octene, and 1-decene. These olefins may be used alone or in any mixture thereof. Particularly desirable alpha-olefins are propylene and 1-butene.

The molar ratio of ethylene/alpha-olefin in the copolymer rubber according to the present invention should be within the range of from 55/45 to 95/5, desirably 60/40 to 85/15. An ethylene content higher than the above-mentioned range undesirably results in poor elastic properties, whereas an ethylene content lower than the above-mentioned range undesirably results in poor vulcanized rubber properties. The content of ethylene and the alpha-olefin can be determined by means of an infrared spectrophotometer or by means of a $C^{13}$ NMR (nuclear magnetic resonance) spectrometer.

The molar ratio of ENB/VNB in the copolymer rubber according to the present invention should be within the range of from 1/1 to 20/1, desirably 2/1 to 10/1. A VNB content lower than the above-mentioned range undesirably results in poor extrudability, whereas a VNB content higher than the above-mentioned range undesirably results in poor vulcanized rubber properties. The content of the polyenes can be represented by an iodine value of the copolymer rubber. The iodine value of the copolymer rubber should be 2 to 40, desirably 5 to 30. The ENB/VNB ratio of the copolymer rubber according to the present invention can also be determined by means of a $C^{13}$ NMR spectrometer or by analyzing the unreacted ENB/VNB content in the polymerization mixture by means of gas chromatography.

The molecular sizes of the copolymer rubber according to the present invention can be represented by an intrinsic viscosity $[\eta]$ of the copolymer rubber determined in decalin at 135° C. The intrinsic viscosity $[\eta]$ of the copolymer rubber should be 1.0 to 6.0 dl/g, desirably 1.2 to 4.0 dl/g. An intrinsic viscosity $[\eta]$ less than 1.0 dl/g undesirably results in poor rolling or milling processability and insufficiently high tensile strength of the copolymer rubber. Contrary to this, when the intrinsic viscosity $[\eta]$ is more than 6.0 dl/g, the rolling or milling processability is decreased and, for example, the surface appearance of the extrudate becomes worse when the copolymer rubber is extruded.

The copolymer rubber of the present invention has a relatively large weight-average molecular weight $<M>_w$ determined by a light-scattering method in proportion to the intrinsic viscosity thereof. This is also represented by a ratio $g_\eta^*$. This ratio $g_\eta^*$ can be defined as follows:

$$g_\eta^* = [\eta]/[\eta]l$$

wherein $[\eta]$ is an intrinsic viscosity of the copolymer rubber of the present invention and $[\eta]l$ is an intrinsic viscosity of a linear ethylene-propylene random copolymer having an ethylene content of 70 mole %, the same weight-average molecular weight $<M>_w$ as that of the copolymer rubber of the present invention having an intrinsic viscosity $[\eta]$, and a Q value (i.e., a ratio of weight-average molecular weight/number-average molecular weight determined by a GPC method) of 2.5, $[\eta]l$ being calculated by the equation:

$$[\eta]l = 7.2 \times 10^{-4} <M>_w^{0.67}$$

The ratio $g_\eta^*$ should be 0.2 to 0.9, desirably 0.4 to 0.8. The above-mentioned standard ethylene-propylene-random copolymer can be readily prepared by copolymerizing ethylene and propylene in the presence of, as a catalyst, $VOCl_3$ and ethylaluminum sesquichloride in hexane.

A value $g_\eta^*$ considerably less than 1 seems to mean the presence of partial cross-linking structures in the copolymer chain, in addition to short chain branches derived from the alpha-olefin which is a copolymerization component with ethylene. It would seem that, without prejudice to the invention, the presence of the above-mentioned partial cross-linking structures improves the processability of the present copolymer rubber. However, the present copolymer rubber is not a highly crosslinked product due to the fact that the copolymer rubber is soluble in boiled hexane.

A Q value, determined by a GPC (gel permeation chromatography) method, of the copolymer rubber of the present invention is desirably 6 or less, more desirably 2 to 6. A copolymer rubber having a Q value of 5 or less has an especially excellent vulcanizate strength and the copolymer rubber having a Q value of 2.5 to 5 has an especially good balance of the strength and the processing characteristics.

The Q value can be determined according to a method described in Takeuchi et al. "Gel Permeation Chromatography" issued from Maruzen, Japan as follows:

(1) A calibration curve of the correlation of a molecular weight M and EV (elution volume) is formed by measuring the molecular weights M and their GPC counts of standard polystyrenes having known molecular weights (mono-dispersed polystyrene manufactured by TOYO SODA K.K.) at a concentration of 0.02% by weight.

(2) A GPC chromatogram of samples is obtained by a GPC measurement, and the number-average molecular weight $M_n$, weight-average molecular weight $M_w$, and a Q value are determined, as polystyrene converted values, from the calibration curve obtained in (1) above.

$$M_w = \frac{\Sigma M_i^2 N_i}{\Sigma N_i}$$

$$M_n = \frac{\Sigma M_i N_i}{\Sigma N_i}$$

$$Q = M_w/M_n$$

The preparation conditions of the samples and the GPC analyzing conditions are as follows:

Sample preparation (a) A sample is taken at a concentration of 0.04% by weight, together with o-dichlorobenzene solvent, in an Erlenmeyer flask.

(b) An anti-oxidant, 2,6-di-tert-butyl-p-cresol is added to the Erlenmeyer flask containing the sample in such an amount that the content of the anti-oxidant becomes 0.1% by weight based on the polymer solution.

(c) The Erlenmeyer flask was heated, while stirring, at a temperature of 140° C. for about 30 minutes to form the solution.

(d) The polymer solution is filtered at a temperature of 135° C. to 140° C. through a 1 μm millipore filter.

(e) The filtrate was subjected to a GPC analyzer.

GPC analyzing conditions (a) Device: Model 200 manufactured by Waters Co., Ltd., (b) Column: Type S (Mixed type) manufactured by Toyo Soda K.K.

(c) Sample amount: 2 ml (d) Temperature: 135° C.

(e) Flow rate: 1 ml/min (f) Number of the total theoretical plate of column: $2 \times 10^4$ to $4 \times 10^4$ (measured by acetone)

The copolymer rubber according to the present invention can be vulcanized in the same manner as in conventional ethylene-propylene-polyene copolymer.

Curing agents usable in the compounding of the present copolymer rubber include, for example, peroxides; sulfur; sulfur compounds such as sulfur monochloride, sulfur dichloride, morpholine disulfide, alkylphenol disulfide, tetramethylthiuram disulfide, and selenium dimethyl dithiocarbamate; and metallic compounds such as magnesium oxide, zinc oxide, and red lead. Of these vulcanizing agents, the use of sulfur or peroxides is desirable. The sulfur is generally used in an amount of 0.1 to 10 parts by weight, desirably 0.5 to 5 parts by weight, based on 100 parts by weight of the rubber component.

In the practice of the vulcanization, a vulcanization accelerator can be optionally used. Examples of the vulcanization accelerator are: thiazole type accelerators such as N-cyclohexyl-2-benzothiazole-sulfenamide, N-oxydiethylene-2-benzothiazole-sulfen-amide, N,N-diisopropyl-2-benzothiazole-sulfenamide, 2-mercaptobenzothiazole, 2-(2,4-dinitrophenyl) mercaptobenzothiazole, 2-(2,6-diethyl-4-morpholinothio) benzothiazole, and benzothiazyl-disulfide; guanidine type accelerators such as diphenylguanidine, triphenylguanidine, di-ortho-tolylguanidine, ortho-tolyl-biguanide, and diphenylguanidine phthalate; acetaldehyde-aniline reaction products; aldehydeamines or aldehyde-ammonia type accelerators such as butylaldehyde-aniline condensates, hexamethylenetetramine, and acetaldehyde ammonia; imidazoline type accelerators such as 2-mercaptoimidazoline; thiourea type accelerators such as thiocarbanilide, diethylthioureadibutyl thiourea, trimethyl thiourea, di-ortho-tolylthiourea; thiuram type accelerators such as tetramethylthiuram monosulfide, tetramethylthiuram disulfide, tetraethylthiuram disulfide, tetrabutylthiuram disulfide, and dipentamethylenethiuram tetrasulfide; dithioic acid salt type accelerators such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium diethyldithiocarbamate; xanthate type accelerators such as zinc dibutylxanthate. These vulcanization accelerators can be generally used in an amount of 0.1 to 20 parts by weight, desirably 0.2 to 10 parts by weight, based on 100 parts by weight of the rubber component.

The ethylene copolymer rubber of the present invention can be vulcanized or cured by using a peroxide type vulcanizing agent. Examples of the peroxide type vulcanizing agents are dicumyl peroxide, 1,1'-di-(t-butylperoxy)-3,3,5-trimethylcyclohexane, di-(t-butyl-peroxy) diisopropylbenzene, and 2,5-dimethyl-2,5-di-(t-butylperoxy) hexane. A vulcanization activator can be optionally used in the vulcanization by the peroxide type vulcanization agents. Examples of these activators are sulfur; sulfur compounds such as dipentamethylenethiuram tetrasulfide; polyfunctional monomers such as ethylene dimethacrylate, divinylbenzene, diallylphthalate, methaphenylene bismaleimide, and toluylenebismaleimide; and oxime compounds such as p-quinonedioxime and p,p'-dibenzoyl quinoneoxime. These activators can be used alone or in any mixture thereof.

In the case where the copolymer rubber of the present invention is vulcanized, activators, dispersants, fillers, softeners, plasticizers, tackifiers, coloring agents, foaming agents, foaming promotors, lubricants, antioxidants and other additives can be optionally used.

Examples of the fillers are inorganic fillers such as carbon black, white carbon (silica), calcium carbonate, talc, and clay; and organic fillers such as high styrene resins, cumarone-indene resins, phenol resins, lignin, modified melamine resins, and petroleum resins. Of these fillers, inorganic fillers can be desirably used.

Examples of the softeners are petroleum type softners such as process oil, lubricating oil, paraffin, liquid paraffin, and, vaselin; coal tar type softeners such as coal tar and coal tar pitch; fatty oil such as castor oil, linseed oil, rapeseed oil, and coconut oil; tall oil; factice or rubber substitute; wax such as beeswax, carnauba wax, and lanolin; fatty acids and fatty acid salts such as ricinoleic acid, palmitic acid, barium stearate, calcium stearate, and zinc laurate; and synthetic polymeric substances such as petroleum resins.

Examples of the plasticizers are phthalic acid ester type, adipic acid ester type, sebacic ester type, and phosphoric acid type plasticizers. Examples of the tackifiers are cumarone-indene resins, terpene-phenol resins, and xylene-formaldehyde resins. Examples of coloring agents are inorganic and organic pigments. Examples of foaming agents are sodium bicarbonate, ammonium carbonate, N,N'-dinitrosopentamethylene tetramine, azocarbon amide, azobisisobutyronitrile, benzenesulfonyl hydrazide toluenesulfonyl hydrazide, calcium azide, and para-toluenesufonyl azide and examples of foaming auxiliaries are salicylic acid, phthalic acid, and urea.

The vulcanization is generally carried out at 100° C. to 250° C., desirably 120° C. to 200° C., for 10 to 60 minutes, desirably 20 to 40 minutes, although they depend upon the kinds of curing agents. Especially when peroxide vulcanization is carried out, the curing time may be about 4 times of the half-life period of the peroxide.

The copolymer rubber of the present invention can be used, without effecting the vulcanization, as a modifier for polyolefin resins such as polyethylene and polypropylene, or a sealant or a waterproofing sheet. Furthermore, a vulcanized copolymer rubber having the increased strength can be used as civil and building materials such as a waterproofing sheet and a roofing sheet; automotive parts such as radiator hoses, heater hoses, window gaskets, and tire tubes; electric insulating materials such as cables and electric wires; and various industrial parts such as various sheets and belts. The copolymer rubber of the present invention can be used, upon foaming, as a sealing material, a thermal insulating material, a cushioning material, and an insulating material.

The copolymer rubber of the present invention can be prepared by copolymerizing ethylene, an alpha-olefin having 3 to 10 carbon atoms, 5-ethylidene-2-norbornene and 5-vinyl-2-norbornene in a hydrocarbon solvent in the presence of a catalyst formed by (i) a soluble vanadium compound having the formula:

$$VO(OR)_n X_{3-n} \tag{I}$$

or $$VX_4 \tag{II}$$

wherein R is a hydrocarbon radical having 1 to 10 carbon numbers, X is a halogen atom, and $0 \leq n \leq 3$; and (ii) an organoaluminum compound $$R'_m AlX'_{3-m} \tag{III}$$

wherein R' is a hydrocarbon radical having 1 to 10 carbon atoms, X' is a halogen atom, and $0 < m < 3$. The copolymerization ratio of ethylene, the alpha-olefin, ENB and VNB can be appropriately selected so as to form the copolymer rubber having the desired composition of these components.

Examples of the vanadium compounds having the general formula (I) or (II) are $VO(OCH_3)Cl_2$, $VO(OCH_3)_2Cl$, $VO(OCH_3)_3$, $VO(OC_2H_5)Cl_2$, VO- $(OC_2H_5)_{1.5}Cl_{1.5}$, $VO(OC_2H_5)_2Cl$, $VO(OC_2H_5)_3$, $VO(OC_2H_5)_{1.5}Br_{1.5}$, $VO(OC_3H_7)Cl_2$, $VO(OC_3H_7)_{1.5}Cl_{1.5}$, $VO(OC_3H_7)_2Cl$, $VO(OC_3H_7)_3$, $VO(On\text{-}C_4H_9)Cl_2$, $VC(On\text{-}C_4H_9)_2Cl$, $VO(Oiso\text{-}C_4H_9)_2Cl$, $VO(Osec\text{-}C_4H_9)_3$, $VO(OC_5H_{11})_{1.5}Cl_{1.5}$, $VOCl_3$, and $VCl_4$. These vanadium compounds can be used alone or in any mixture thereof. Of these compounds, $VO(OC_2H_5)Cl_2$ and $VOCl_3$ can be desirably used in the practice of the production of the copolymer rubber according to the present invention.

Examples of organoaluminum compounds having the general formula (III) are those having $0.5 \leq m \leq 2.5$, desirably $1 \leq m \leq 2$. Typical examples of such compounds are $(CH_3)_2AlCl$, $(CH_3)_{1.5}AlCl_{1.5}$, $(CH_3)AlCl_2$, $(C_2H_5)_2AlCl$, $(C_2H_5)_{1.5}AlCl_{1.5}$, $(C_2H_5)AlCl_2$, $(C_3H_7)_2AlCl$, $(C_3H_7)_{1.5}AlCl_{1.5}$, $(C_3H_7)AlCl_2$, $(C_6H_{13})_2AlCl$, $(C_6H_{13})_{1.5}AlCl_{1.5}$, and $(C_6H_{13})AlCl_2$. These compounds can be used alone or in any mixture thereof.

The ratio of the organoaluminum compound to the vanadium compound in the catalyst composition used in the preparation of the copolymer rubber according to the present invention is such that an atomic ratio of Al/V in the catalyst composition is desirably 2 to 50, more desirably 5 to 30.

The copolymerization can be carried out in a hydrocarbon solvent. Examples of such hydrocarbon solvents are aliphatic hydrocarbons having 3 to 15 carbon atoms such as hexane, heptane, octane, and kerosine; and alicyclic hydrocarbons having 6 to 10 carbon atoms such as cyclohexane; aromatic hydrocarbons having 6 to 10 carbon atoms such as benzene, toluene, and xylene. These hydrocarbons can be used alone or in any mixture thereof. Alternatively, an excess amount of an alpha-olefin can be used as a reaction medium in the copolymerization.

The copolymerization can be carried out in a solvent in the following manner. For example, the copolymerization reaction is carried out in the presence of desirably 0.01 to 5 mmol/l, more desirably 0.1 to 2 mmol, of the above-mentioned vanadium compound in the hydrocarbon solvent. The feed ratio of ethylene to the alpha-olefin is generally 20/80 to 80/20 in a molar ratio and the feed ratio of ENB to VNB is 1/1 to 20/1, desirably 2/1 to 10/1, although these ratios depend on the polymerization conditions. The polymerization temperature is generally 0° C. to 100° C., desirably 20° C. to 80° C. The polymerization pressure is generally 0 to 50 kg/cm², desirably 0 to 20 kg/cm². A molecular weight modifier such as hydrogen can be optionally used in the copolymerization to control the molecular weight of the copolymer rubber. After the completion of the copolymerization, a polymerization terminator such as methanol, isopropanol, water, or ethylene oxide is added to the copolymerization mixture to terminate the copolymerization. The copolymer rubber thus obtained can be recovered from the copolymerization mixture by separating the solvent from the copolymerization mixture in any conventional manner including steam stripping.

EXAMPLE

The present invention now will be further illustrated by, but is by no means limited to, the following examples.

Example 1

Quarterly copolymerization of ethylene, propylene, 5-ethylidene-2-norbornene and 5-vinyl-2-norbornene was continuously carried out in a 15 liter stainless steel reactor provided with an agitating blade.

That is, hexane was continuously fed as a polymerization solvent to the reactor from the top thereof at a feed rate of 5 l/hr, while the polymerization liquid was continuously discharged from the bottom of the reactor so that the volume of the polymerization liquid in the reactor was maintained to 5 liters.

As a polymerization catalyst, (A) vanadium oxytrichloride and (B) ethylaluminum sesquichloride were continuously fed to the reactor from the top thereof in such feed rates that the concentrations of vanadium atom and aluminum atom in the reactor were maintained at 0.25 mmol/l and 2 mmol/l, respectively. A gas mixture of ethylene and propylene containing 45 mole % of ethylene and 55 mole % of propylene was continuously fed to the reactor from the top thereof at a feed rate of 450 l/hr and a hydrogen gas was fed as a molecular weight modifier to the reactor at a feed rate of 3 l/hr. 5-ethylidene-2-norbornene and 5-vinyl-2-norbornene were continuously fed from the top of the reactor at a feed rate of 18 g/hr and 4 g/hr, respectively.

The continuous copolymerization was carried out at a temperature of 45° C. and a pressure of 5.5 kg/cm² (gauge), while the reactor was cooled by circulating cooling water through a cooling jacket provided at the outside of the reactor. The continuous copolymerization under the above-mentioned conditions formed the desired ethylene-propylene-5-ethylidene-2-norbornene-5-vinyl-2-norbornene copolymer in the form of a uniform solution.

A small amount of methanol was added to the polymerization solution discharged from the bottom of the reactor to terminate the copolymerization reaction. The copolymer was separated from the solvent by steam stripping and, then, was vacuum dried at a temperature of 80° C. for one day. Thus, 270 g/hr of the desired ethylene-propylene-5-ethylidene-2-norbornene-5-vinyl-2-norbornene copolymer was obtained. The copolymer thus obtained had the following characteristics:

| | |
|---|---|
| Ethylene content: | 78.7 mole % |
| Intrinsic viscosity [η]: | 2.12 dl/g |
| Iodine value: | 13.0 |
| ENB/VNB mole ratio: | 5.1/1 |
| Q value: | 4.6 |
| $g_\eta^*$: | 0.63 |

One hundred parts by weight of the copolymer obtained above was compounded with 5 parts of zinc oxide, 1 part of stearic acid, 60 parts of HAF carbon black, 80 parts of calcium bicarbonate, 40 parts of paraffinic oil, 0.75 parts of 2-mercaptobenzothiazole, 0.75 parts of dibenzothiazyl disulfide, 0.5 parts of tetramethylthiuram disulfide, and 1 part of sulfur (all by weight) by roll milling on 8 inch open rolls at a roll temperature of 60° C. for 30 minutes.

The compound obtained above was press-cured at a temperature of 160° C. under a pressure of 150 kg/cm² for 20 minutes to form vulcanizate. The vulcanizate thus obtained was subjected to a tensile test according to a JIS (Japanese Industrial Standards)-K-6301 method. The tensile stress at break of the vulcanizate was 175 kg/cm².

The optimum curing time of the compound was evaluated at a temperature of 160° C. by using a oscillating disc rheometer (manufactured by TOYO SEIKI K.K., Japan). As a result, $T_{90}$, i.e., a time of 90% of the effective torque (the difference between the maximum torque and the minimum torque) of the vulcanizate of the copolymer compound obtained above was 16 minutes.

Furthermore, the unvulcanized rubber compound obtained above was extruded at a extrusion temperature of 100° C. and a take-off speed of 5 m/min by using a 50 mm$\phi$ extruder (L/D=14, compression ratio of 1.1, Garvey die). Thus, the surface appearance of the extruded strand was observed. The surface appearance of the extrudate was evaluated as an index of extrudability according to the following rating criteria:

5: No surface roughness, good gloss
4: No substantial surface roughness, not glossy
3: Slight surface roughness, not glossy
2: Surface roughness, not glossy
1: Extreme surface roughness, no gloss The extrudate from the compound obtained above had a rating of the surface appearance of 5.

Examples 2 to 4 and Comparative Examples 1 to 5

Various copolymers having different properties were obtained in the same manner as described in Example 1, except that the copolymerization conditions were changed as shown in Table 1.

The copolymers thus obtained were evaluated in the same manner as described in Example 1. The results are shown in Table 2.

TABLE 1

| | V Compound | V Concentration (mM/l) | Al Compound | Al/V (mole ratio) | Diene (g/hr) | $C_2/C_3$ (mol/mol) · l/hr | $H_2$ (l/hr) | Polym. temp. (°C.) | Yield (g/hr) | $C_2$ (mol %) | $[\eta]$ (dl/g) | Iodine value | ENB/VNB (mole ratio) | Q | $g_\eta$* |
|---|---|---|---|---|---|---|---|---|---|---|---|---|---|---|---|
| Example 1 | VOCl$_3$ | 0.25 | Et$_{1.5}$AlCl$_{1.5}$ | 8 | ENB (18) VNB (4) | (45/55) · 450 | 3.0 | 45 | 270 | 78.7 | 2.12 | 13.0 | 5.1 | 4.6 | 0.63 |
| Example 2 | " | " | " | " | ENB (8) VNB (4) | (45/55) · 450 | 2.5 | " | 285 | 76.5 | 2.36 | 8.5 | 2.3 | 4.5 | 0.64 |
| Example 3 | " | " | " | " | ENB (18) VNB (2) | (45/55 · 450 | 3.0 | " | 280 | 78.5 | 2.25 | 11.8 | 9.2 | 3.4 | 0.77 |
| Example 4 | VO(OEt)Cl$_2$ | 0.7 | Et$_{1.5}$AlCl$_{1.5}$/ EtAlCl$_2$ = 7/3 | " | ENB (18) VNB (4) | (37/63) · 450 | 1.5 | 60 | 260 | 78.0 | 2.20 | 13.6 | 5.3 | 4.7 | 0.62 |
| Example 5 | VOCl$_3$ | 0.6 | Et$_{1.5}$AlCl$_{1.5}$ | " | ENB (18) VNB (4) | (35/65) · 450 | 1.0 | 45 | 260 | 63.4 | 2.38 | 13.4 | 5.5 | 4.8 | 0.57 |
| Example 6 | VO(OEt)Cl$_2$ | 0.7 | Et$_{1.5}$AlCl$_{1.5}$/ EtAlCl$_2$ = 7/3 | " | ENB (18) VNB (4) | C$_2$/1-C$_4$ (58/42) · 650 | 1.5 | 60 | 352 | 91.2 | 1.53 | 11.3 | 6.0 | 2.9 | 0.60 |
| Comparative example 1 | VOCl$_3$ | 0.3 | Et$_{1.5}$AlCl$_{1.5}$ | " | DCPD (25) | (45/55) · 450 | 3.0 | 45 | 280 | 76.9 | 2.15 | 10.7 | — | 4.4 | 0.45 |
| Comparative example 2 | " | 0.2 | " | " | ENB (18) | (45/55) · 450 | 2.0 | " | 275 | 77.6 | 2.24 | 11.2 | — | 2.6 | 0.95 |
| Comparative example 3 | " | 0.25 | " | " | ENB (8) VNB (12) | (45/55) · 450 | 3.0 | " | 275 | 78.4 | 2.18 | 9.5 | 0.75 | 7.5 | 0.18 |
| Comparative example 4 | " | 0.3 | " | " | ENB (30) VNB (1) | (45/55) · 450 | 3.5 | " | 280 | 76.4 | 2.06 | 18.4 | 25 | 2.8 | 0.91 |
| Comparative example 5 | " | 0.25 | " | " | ENB (18) DCPD (4) | (45/55) · 450 | 3.0 | " | 265 | 79.0 | 2.14 | 11.8 | ENB/DCPD (mole ratio) 5.3 | 2.8 | 0.92 |

ENB: 5-Ethylidene-2-norbornene
VNB: 5-Vinyl-2-norbornene
DCPD: Dicyclopentadiene
C$_2$: Ethylene
C$_3$: Propylene
1-C$_4$: 1-Butene

TABLE 2

| No. | Tensile stress at break of vulcanizate (kg/cm$^2$) | Optimum curing time T$_{90}$ (min · sec) | Surface of extrudate appearance |
|---|---|---|---|
| Example 1 | 175 | 16'00" | 5 |
| Example 2 | 170*[1] | 23'15" | 5 |
| Example 3 | 180 | 16'30" | 4 |
| Example 4 | 182 | 16'15" | 5 |
| Example 5 | 160 | 16'15" | 5 |
| Example 6 | 172 | 16'15" | 5 |

TABLE 2-continued

| No. | Tensile stress at break of vulcanizate (kg/cm$^2$) | Optimum curing time T$_{90}$ (min · sec) | Surface of extrudate appearance |
|---|---|---|---|
| Comparative example 1 | 140*$^2$ | 35'00" | 4 |
| Comparative example 2 | 178 | 16'00" | 1 |
| Comparative example 3 | 120*$^1$ | 25'15" | 3 |
| Comparative example 4 | 174 | 9'30" | 2 |
| Comparative example 5 | 175 | 16'15" | 1 |

*$^1$160° C. × 30 min vulcanizate
*$^2$160° C. × 40 min vulcanizate

We claim:

1. Ethylene-alpha-olefin-polyene random copolymer rubber comprising ethylene, an alpha-olefin having 3 to 10 carbon atoms, and a polyene, wherein:
   (A) a molar ratio of ethylene/alpha-olefin is 55/45 to 95/5;
   (B) the polyene is a mixture of 5-ethylidene-2-norbornene (ENB) and 5-vinyl-2-norbornene (VNB) in a molar ratio of ENB/VNB of 1/1 to 20/1;
   (C) an iodine value of the copolymer rubber is 2 to 40;
   (D) an intrinsic viscosity [$\eta$] of the copolymer rubber is 1.0 to 6.0 dl/g measured in decalin at 135° C.; and
   (E) g$_\eta$* defined by a ratio of the intrinsic viscosity [$\eta$] to an intrinsic viscosity [$\eta$]l of a linear ethylene-propylene random copolymer having an ethylene content of 70 mole % and the same weight-average molecular weight determined by a light-scattering method as that of the copolymer rubber is 0.2 to 0.8.

2. Ethylene-alpha-olefin-polyene random copolymer rubber as claimed in claim 1, wherein a Q value defined by a ratio the weight-average molecular weight number-average molecular weight of the copolymer rubber is not more than 6.

3. Vulcanizate of ethylene-alpha-olefin-polyene random copolymer rubber comprising ethylene, an alpha-olefin having 3 to 10 carbon atoms and a polyene, wherein:
   (A) a molar ratio of ethylene/alpha-olefin is 55/45 to 95/5;
   (B) the polyene is a mixture of 5-ethylidene-2-norbornene (ENB) and 5-vinyl-2-norbornene (VNB) in a molar ratio of ENB/VNB of 1/1 to 20/1;
   (C) an iodine value of the copolymer rubber is 2 to 40;
   (D) an intrinsic viscosity [$\eta$] of the copolymer rubber is 1.0 to 6.0 dl/g measured in decalin at 135° C.; and
   (E) g$_\eta$* defined by a ratio of the intrinsic viscosity [$\eta$] to an intrinsic viscosity [$\eta$]l of a linear ethylene-propylene random copolymer having an ethylene content of 70 mole % and the same weight-average molecular weight determined by a light-scattering method as that of the copolymer rubber is 0.2 to 0.8.

4. A process for preparing ethylene-alpha-olefin-polyene random copolymer rubber of claim 1 comprising the step of copolymerizing ethylene, an alpha-olefin having 3 to 10 carbon atoms, 5-ethylidene-2-norbornene, and 5-vinyl-2-norbornene in a hydrocarbon solvent in the presence of a catalyst formed by
   (i) a soluble vanadium compound having the formula:

$$VO(OR)_n X_{3-n} \qquad (I)$$

or $$VX_4 \qquad (II)$$

wherein R is a hydrocarbon radical having 1 to 10 carbon numbers, X is a halogen atom, and $0 \leq n \leq 3$; and
   (ii) an organoaluminum compound $$R'_m AlX'_{3-m} \qquad (III)$$

wherein R' is a hydrocarbon radical having 1 to 10 carbon atoms, X' is a halogen atom, and $0 < m < 3$.

5. A process as claimed in claim 4, wherein an atomic ratio of Al/V in the catalyst is 2 to 50.

6. A process as claimed in claim 4, wherein a molar ratio of ethylene/alpha-olefin is 20/80 to 80/20.

7. A process as claimed in claim 4, wherein a molar ratio of 5-ethylidene-2-norbornene/5-vinyl-2-norborene is 1/1 to 20/1.

* * * * *